(12) United States Patent
Amaya et al.

(10) Patent No.: US 10,946,582 B2
(45) Date of Patent: Mar. 16, 2021

(54) METHOD FOR PRODUCING A THREE-DIMENSIONAL SHAPED PRODUCT

(71) Applicant: Matsuura Machinery Corporation, Fukui (JP)

(72) Inventors: Kouichi Amaya, Fukui (JP); Seiichi Tomita, Fukui (JP)

(73) Assignee: Matsuura Machinery Corporation, Fukui (JP)

( * ) Notice: Subject to any disclaimer, the term of this patent is extended or adjusted under 35 U.S.C. 154(b) by 0 days.

(21) Appl. No.: 16/671,370

(22) Filed: Nov. 1, 2019

(65) Prior Publication Data

US 2020/0276754 A1 Sep. 3, 2020

(30) Foreign Application Priority Data

Mar. 1, 2019 (JP) .............................. JP2019-037139

(51) Int. Cl.
*B33Y 10/00* (2015.01)
*B29C 64/153* (2017.01)
*B29C 64/364* (2017.01)
*B29C 64/245* (2017.01)
*B29C 64/393* (2017.01)
*B29C 64/268* (2017.01)
*B29C 64/205* (2017.01)
*B29C 64/386* (2017.01)
*B33Y 50/00* (2015.01)
*B33Y 40/00* (2020.01)
*B33Y 50/02* (2015.01)

(52) U.S. Cl.
CPC .......... *B29C 64/153* (2017.08); *B29C 64/205* (2017.08); *B29C 64/245* (2017.08); *B29C 64/268* (2017.08); *B29C 64/364* (2017.08); *B29C 64/386* (2017.08); *B29C 64/393* (2017.08); *B33Y 50/00* (2014.12); *B33Y 10/00* (2014.12); *B33Y 40/00* (2014.12); *B33Y 50/02* (2014.12)

(58) Field of Classification Search
CPC ... B29C 64/153; B29C 64/354; B29C 64/245; B29C 64/386; B29C 64/393; B29C 64/268; B29C 64/205; B33Y 50/00; B33Y 50/02; B33Y 10/00; B33Y 40/00
USPC .................................................... 264/497
See application file for complete search history.

(56) References Cited

U.S. PATENT DOCUMENTS

| | | | |
|---|---|---|---|
| 9,776,362 B2 * | 10/2017 | Chuang | B33Y 50/02 |
| 2017/0136696 A1 * | 5/2017 | Jakimov | B29C 64/153 |
| 2020/0114425 A1 * | 4/2020 | Ott | B29C 64/371 |

FOREIGN PATENT DOCUMENTS

| | | | |
|---|---|---|---|
| JP | 2006-124732 A | 5/2006 | |
| JP | 2017-177557 A | 10/2017 | |

(Continued)

*Primary Examiner* — Jeffrey M Wollschlager
*Assistant Examiner* — Xue H Liu
(74) *Attorney, Agent, or Firm* — Richard M. Goldberg

(57) ABSTRACT

A method for producing a three-dimensional shaped product based on dispersion of powder by a squeegee and irradiation of the powder layer with a laser beam or electron beam, including the steps of installing a suction device that suctions fumes generated from the powder layer, in a state surrounding the entire periphery of a shaping table, and selecting a suction reference position at the shortest distance from the irradiation reference position currently moved and worked in a prescribed time range.

20 Claims, 14 Drawing Sheets

(56) References Cited

FOREIGN PATENT DOCUMENTS

| | | |
|---|---|---|
| JP | 2017-206744 A | 11/2017 |
| JP | 2018-72926 A | 5/2018 |

* cited by examiner

[Fig.1]
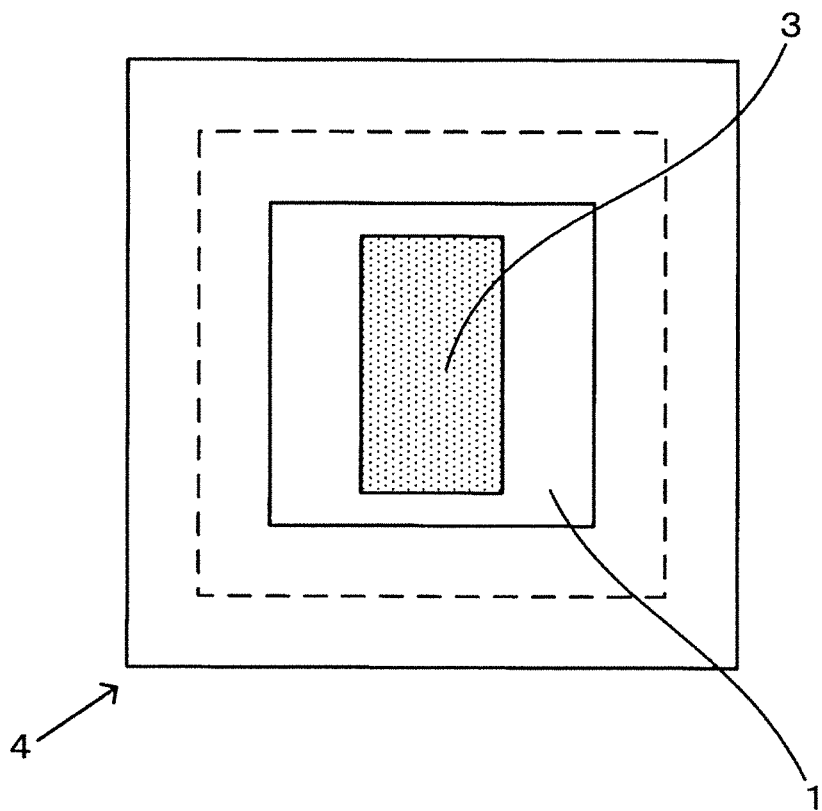
[Fig.2]
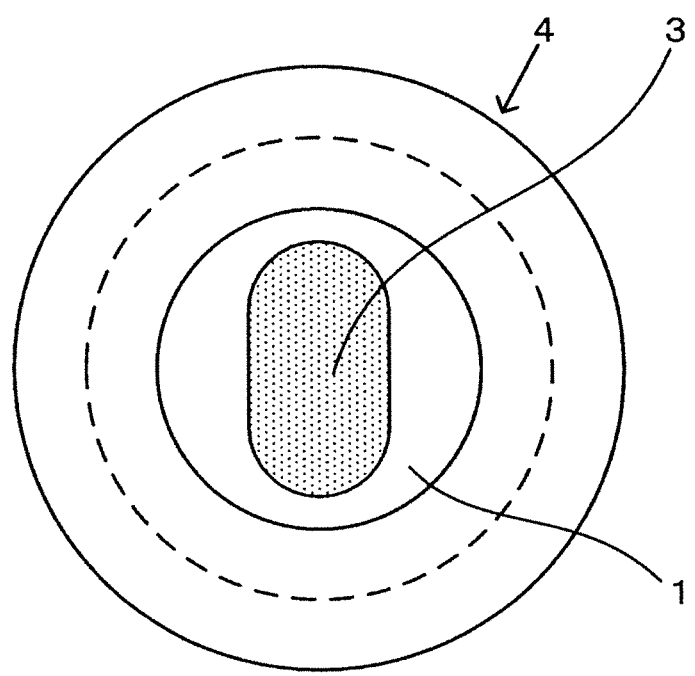

[Fig. 3(a)]
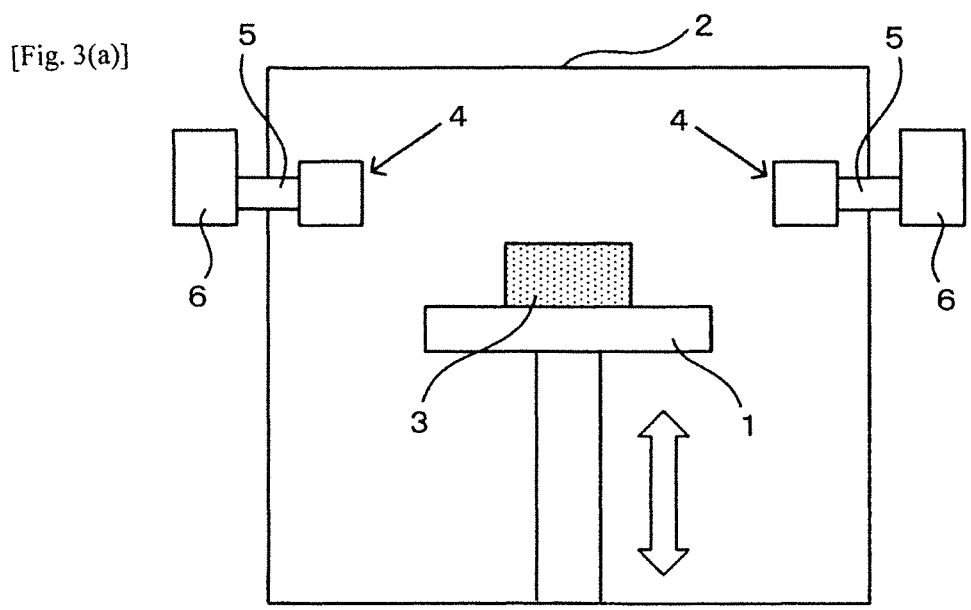
[Fig. 3(b)]
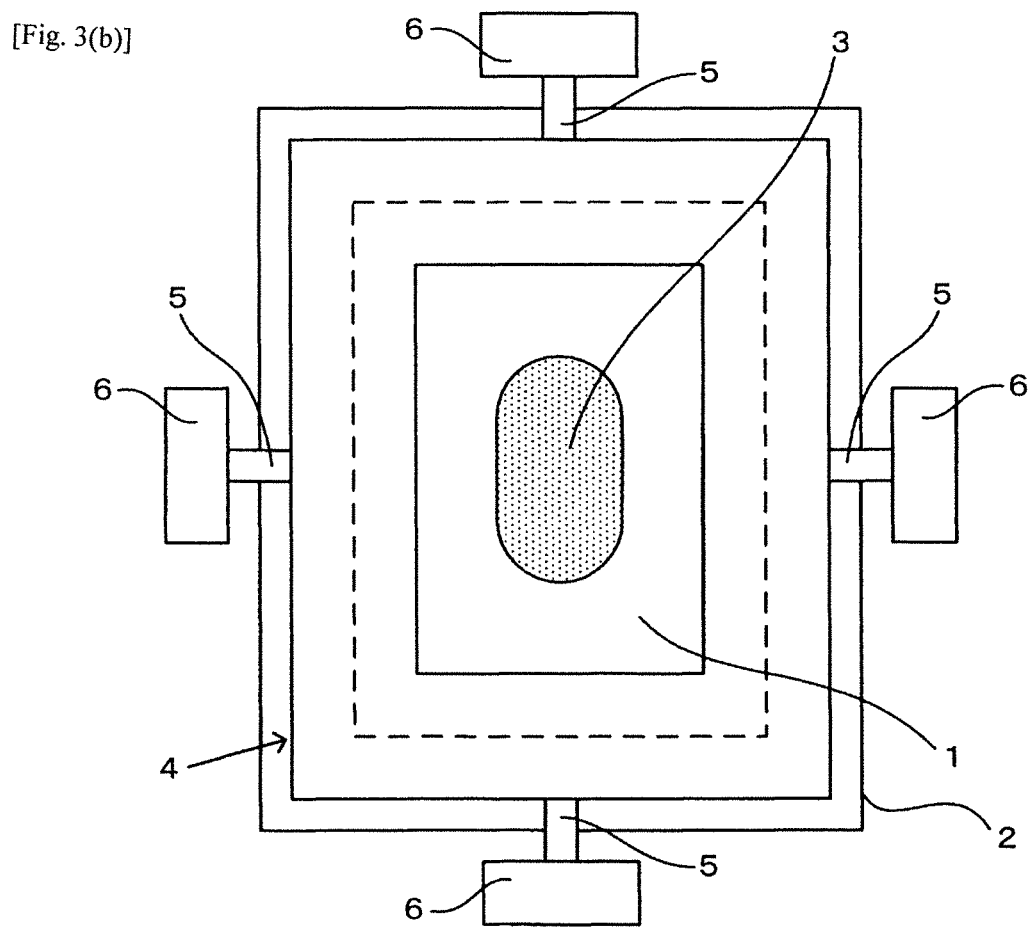

[Fig. 4(a)]
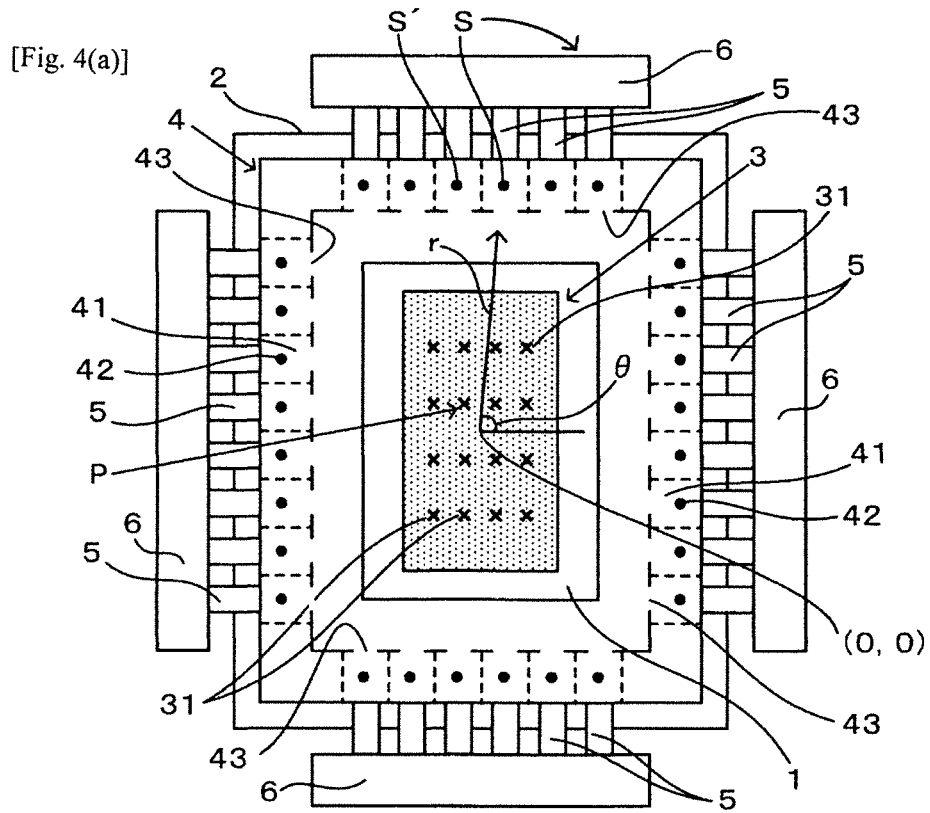
[Fig. 4(b)]
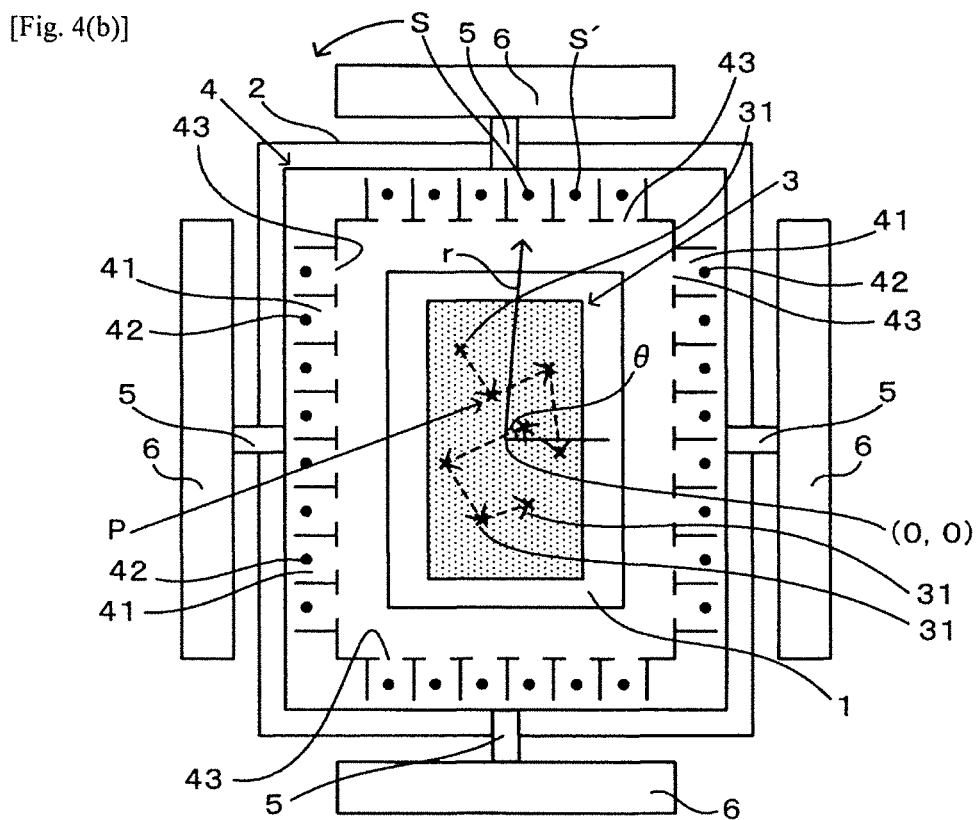

[Fig.5(a)]
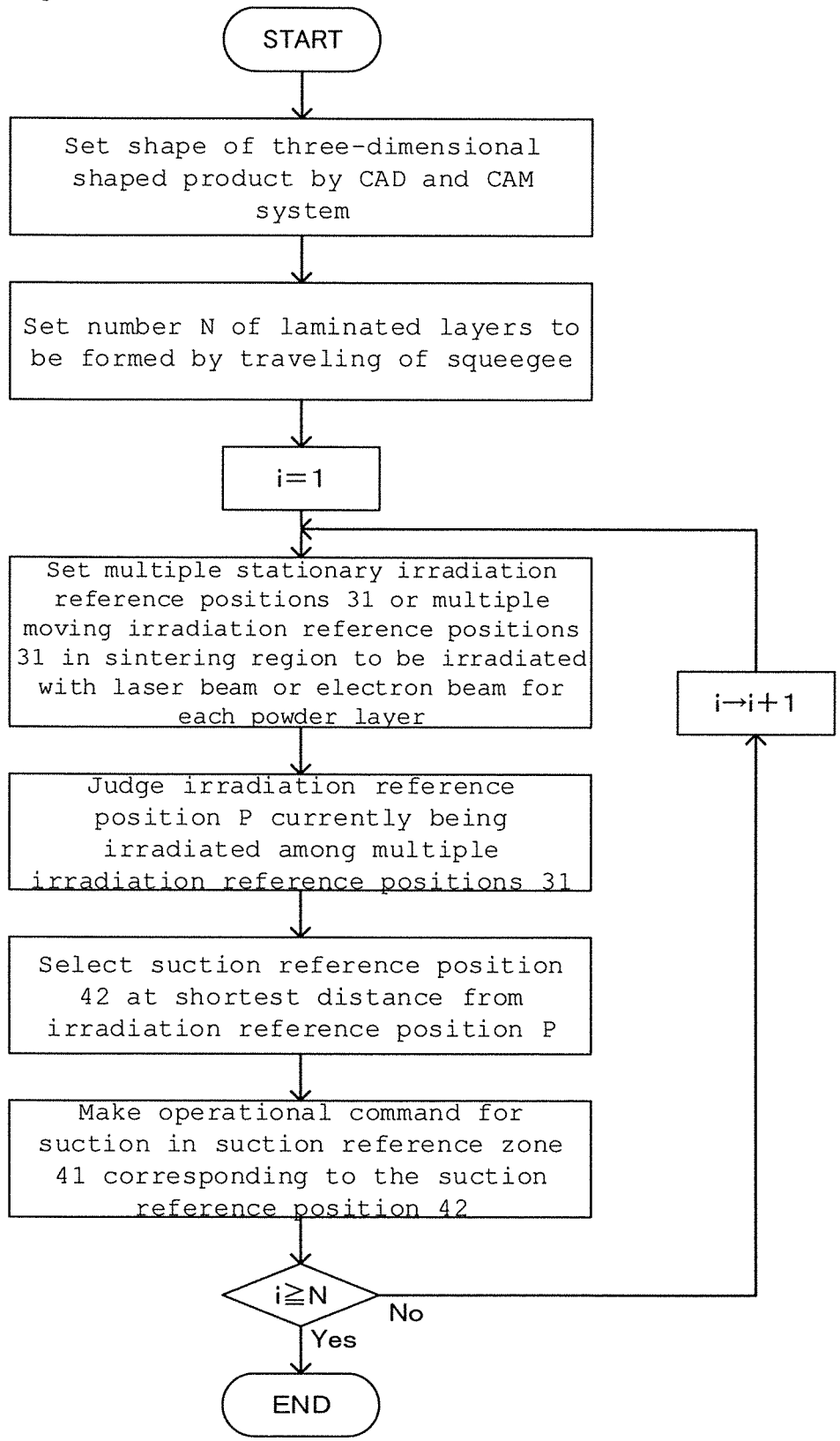

[Fig.5(b)]
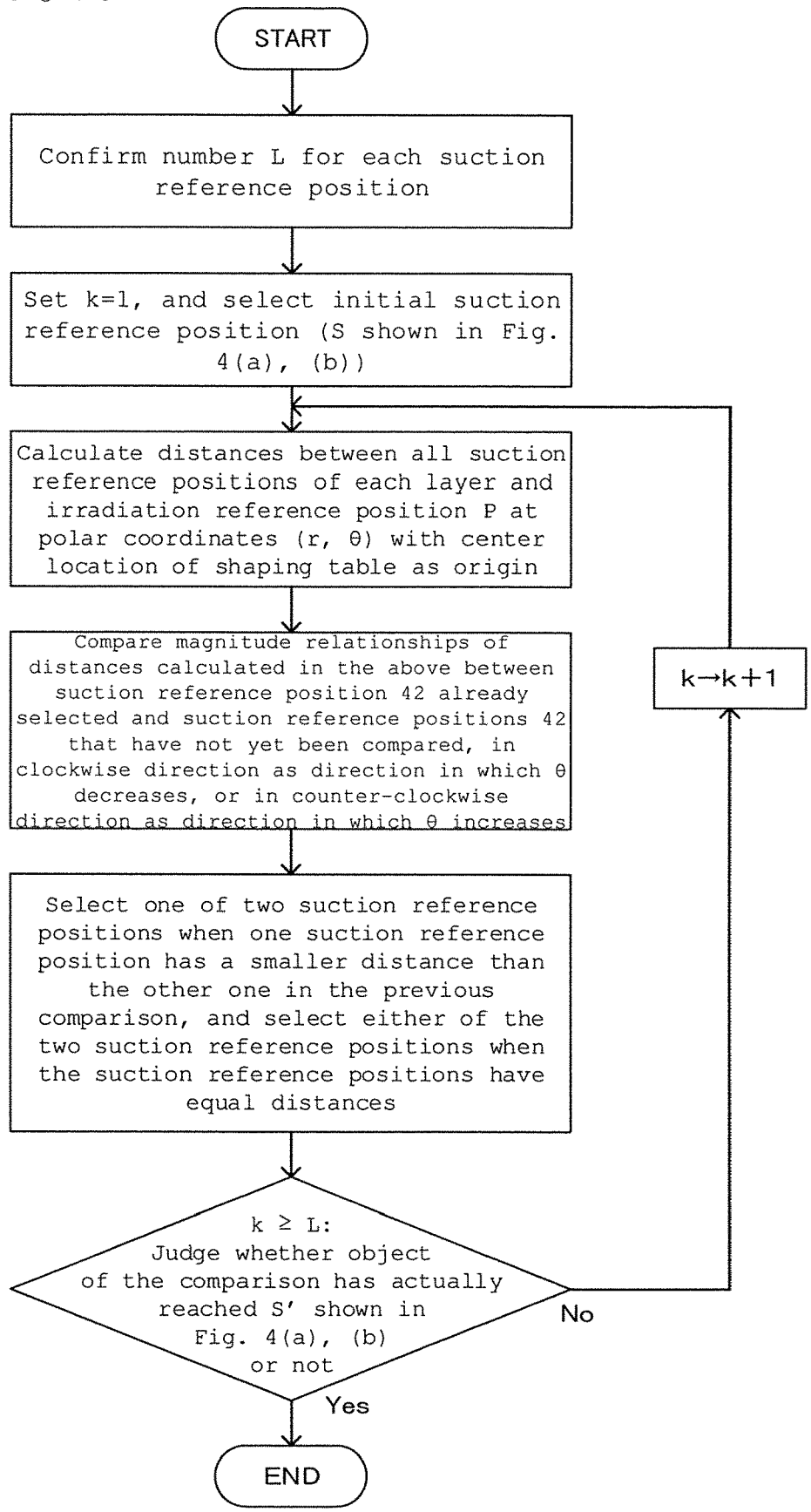

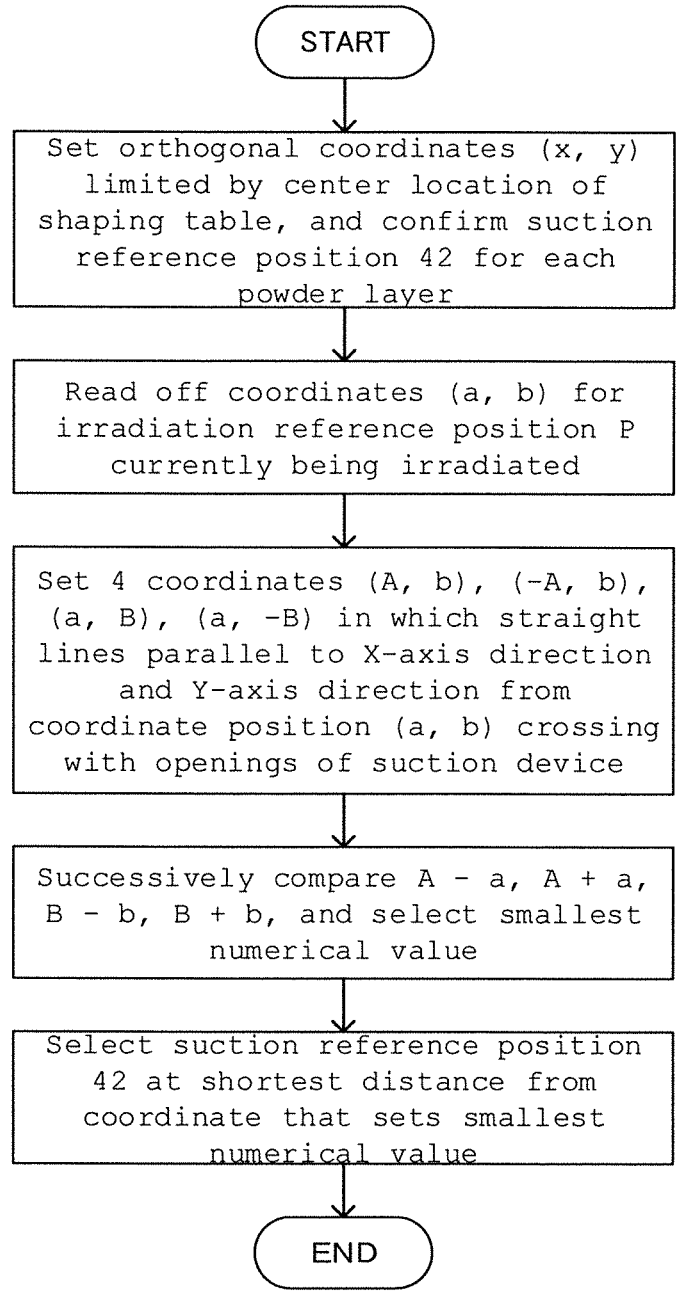
[Fig.5(c)]

[Fig.6]
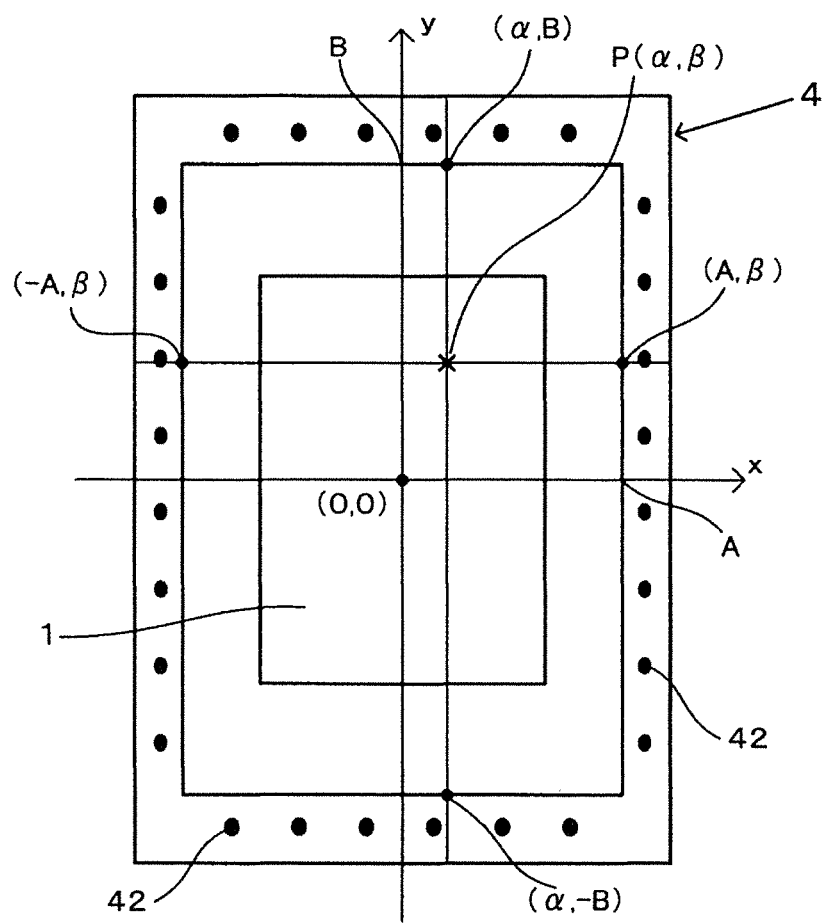

[Fig. 7(a)]
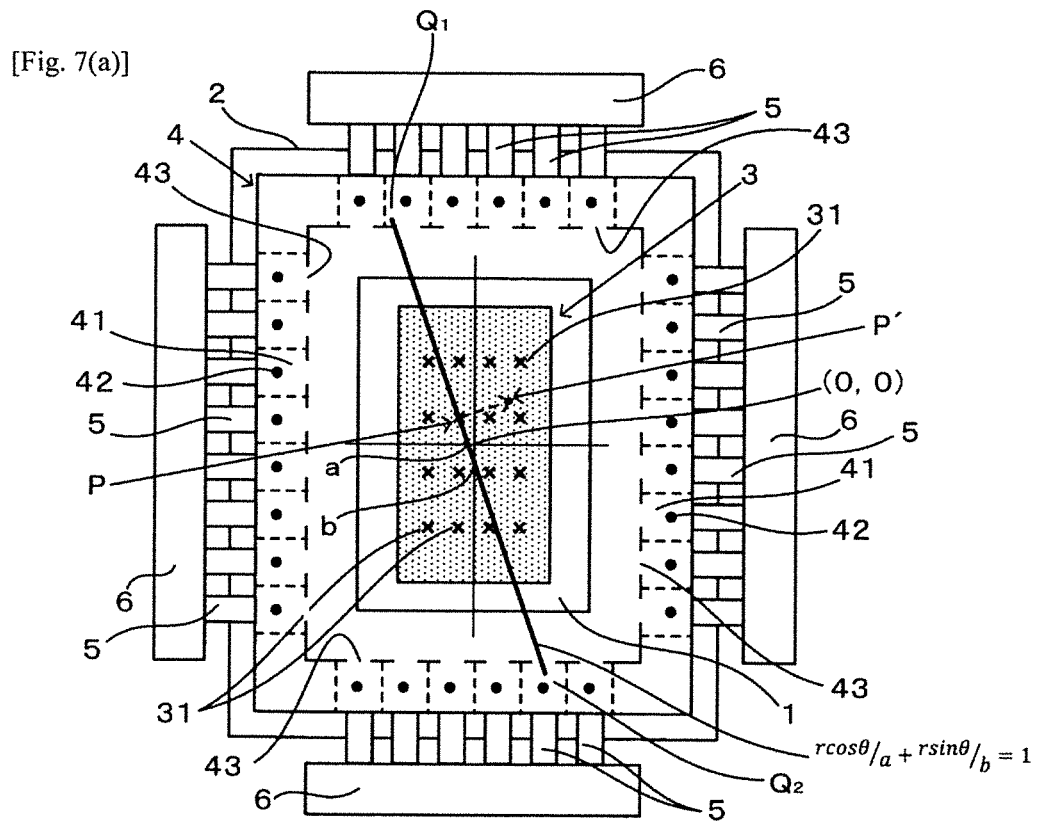
[Fig. 7(b)]
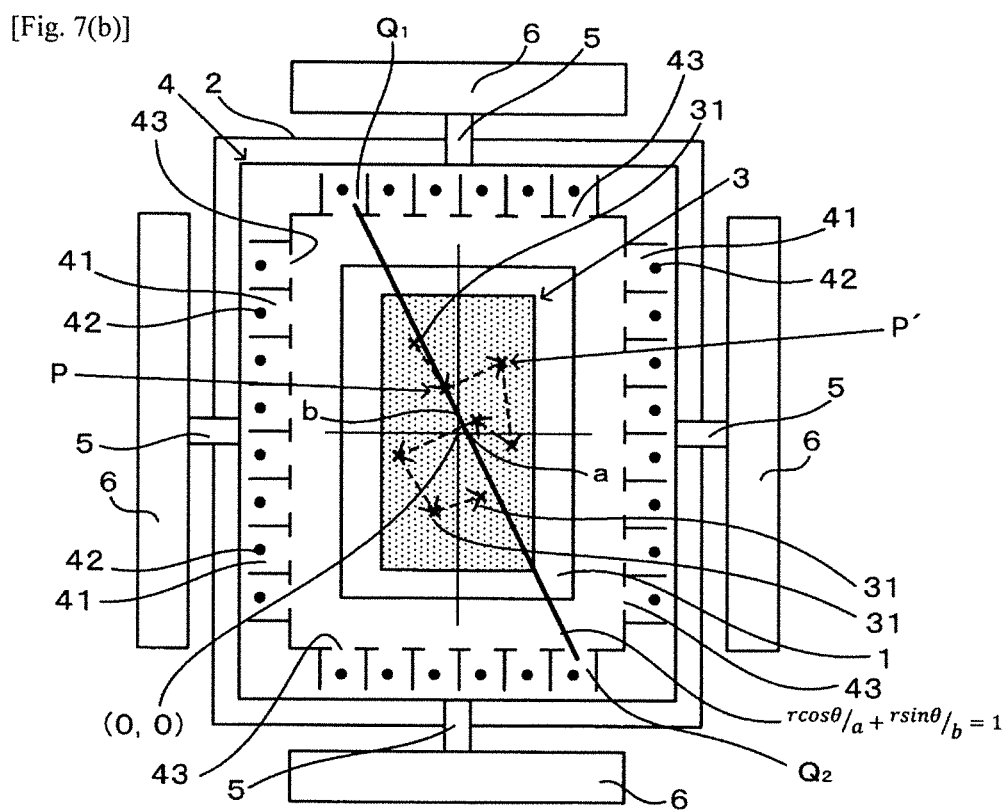

[Fig.8(a)]
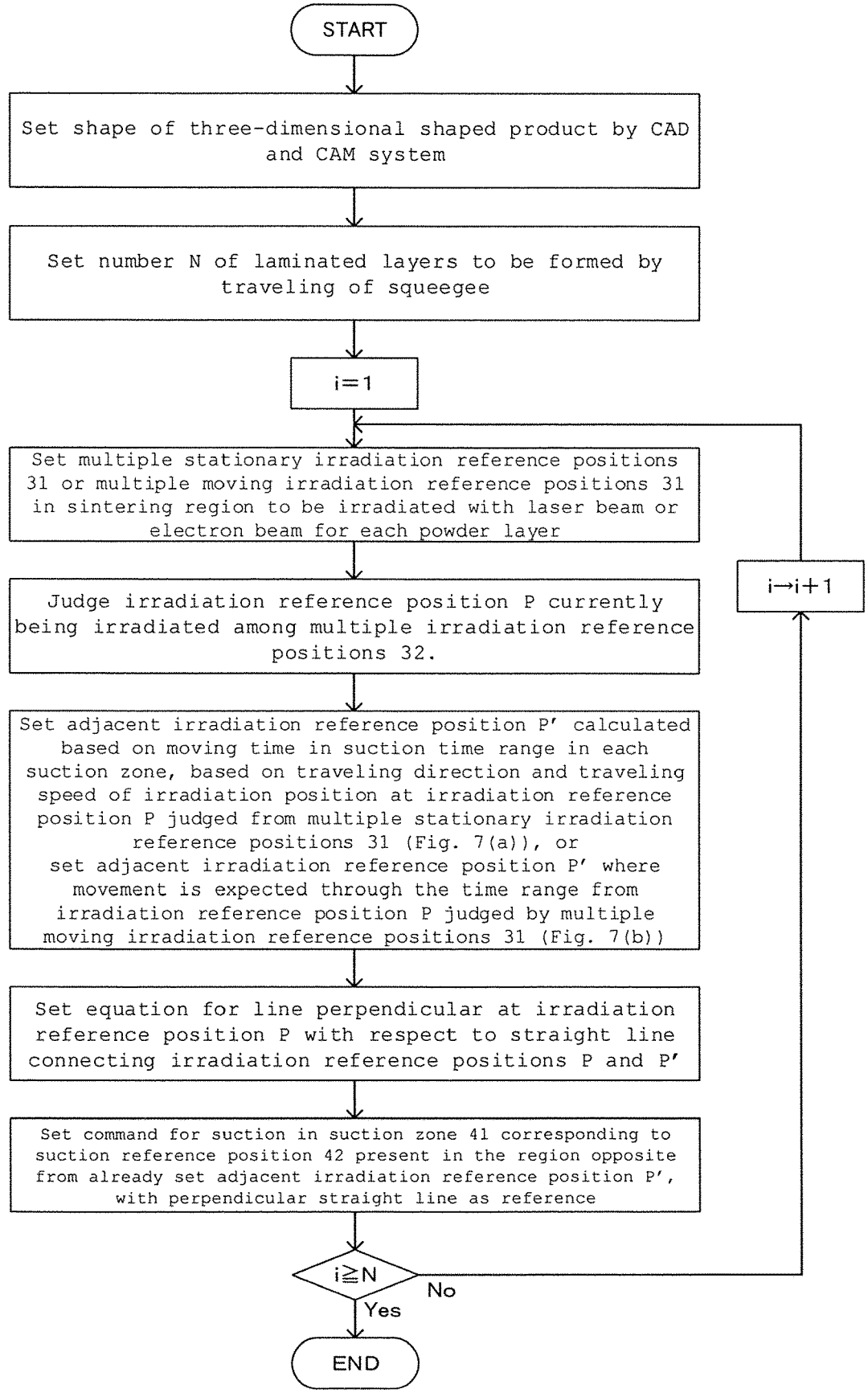

[Fig.8(b)]
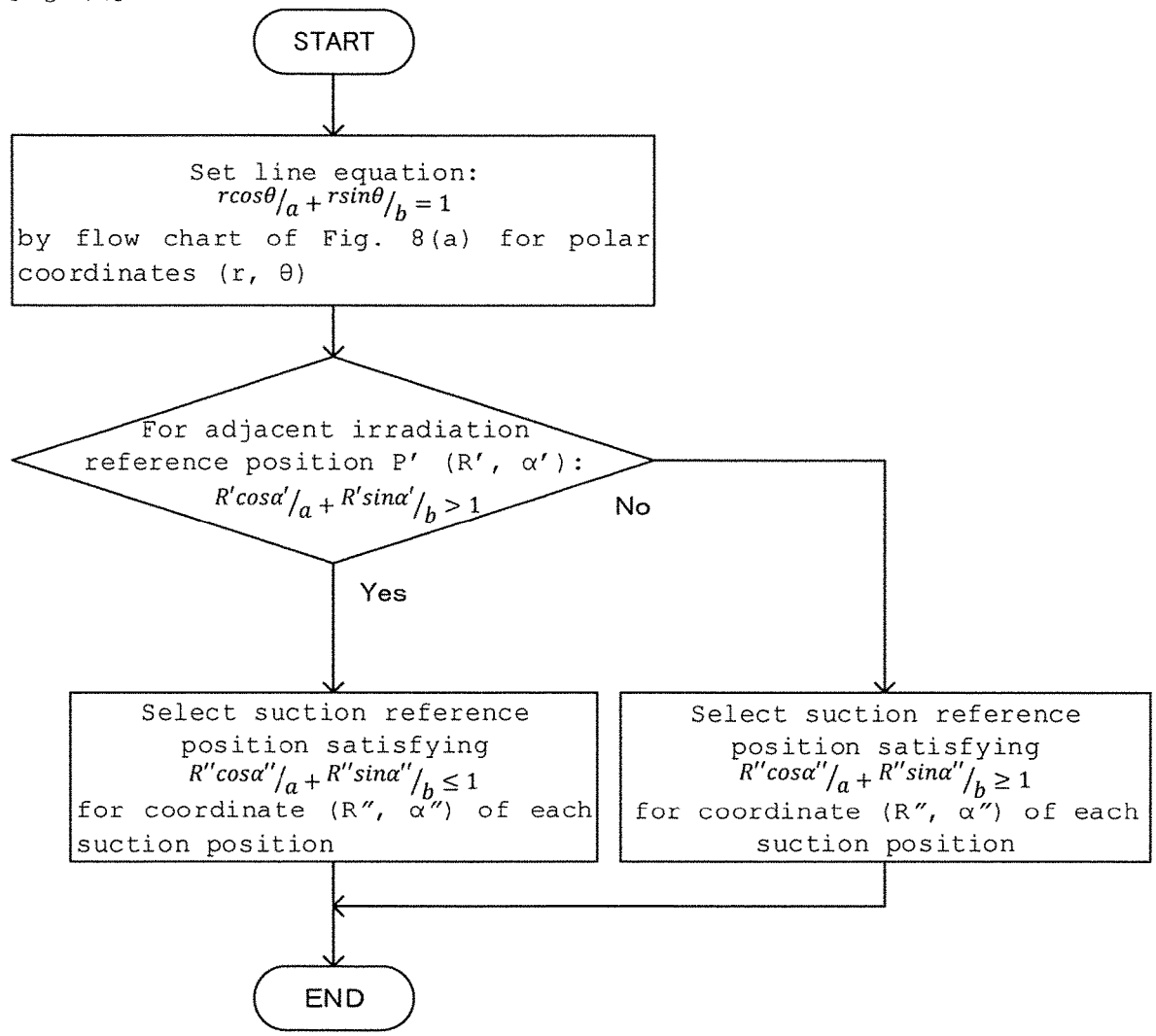

[Fig.8(c)]
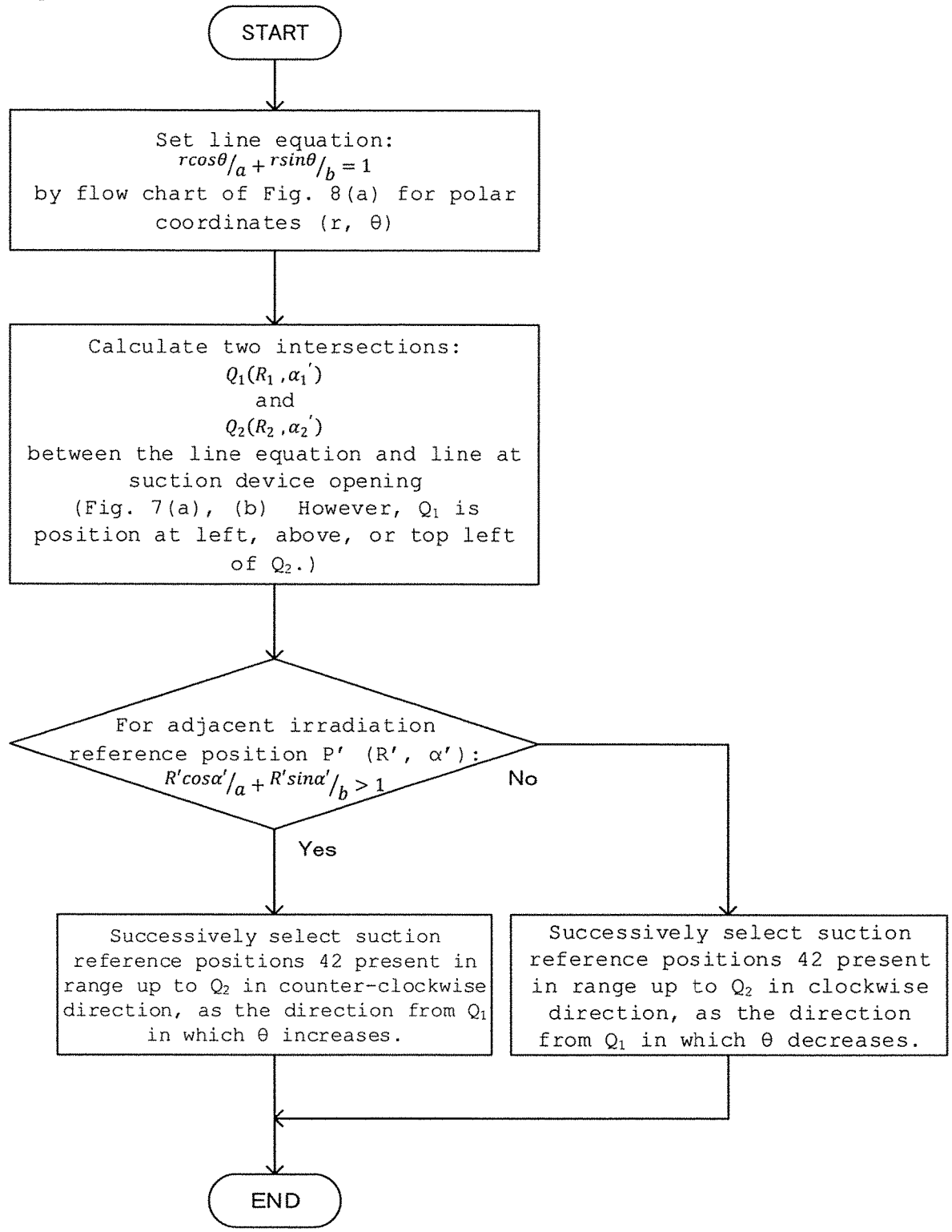

[Fig. 9(a)]
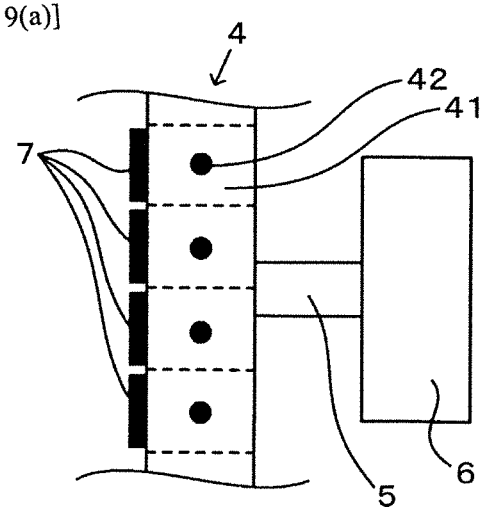
[Fig. 9(b)]
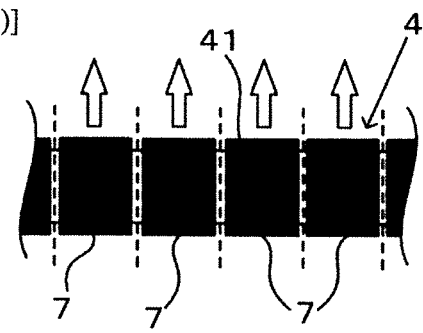

[Fig. 10(a)]
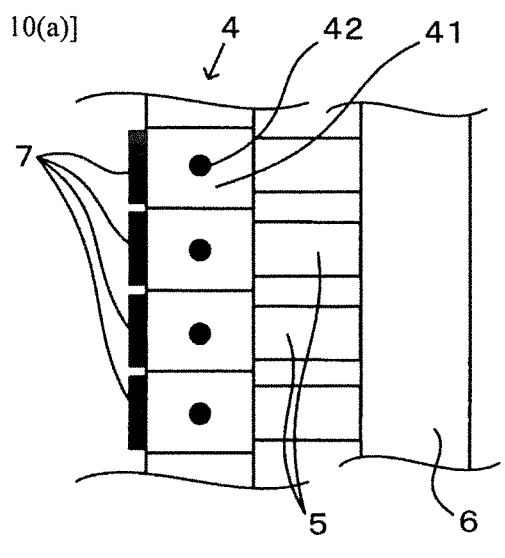
[Fig. 10(b)]
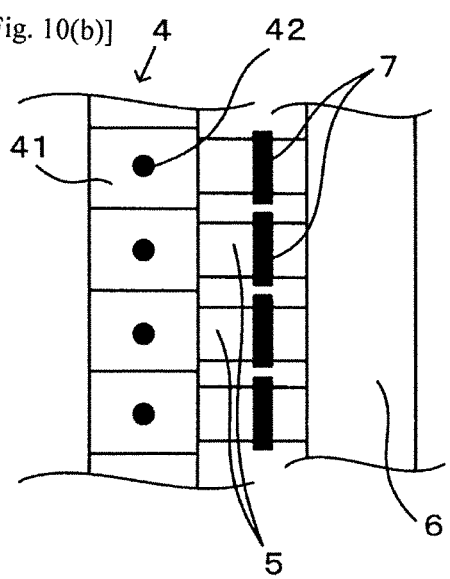
[Fig. 10(c)]
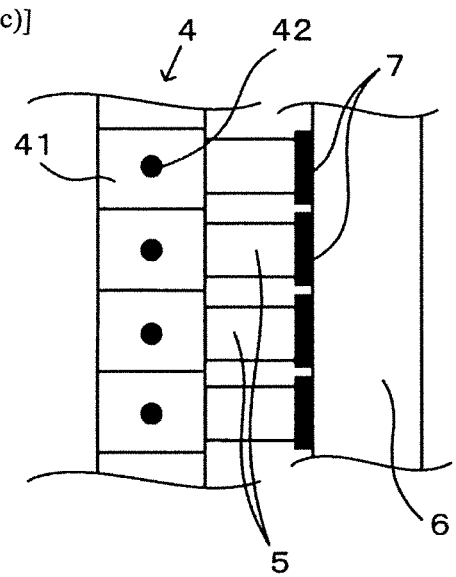

[Fig. 11(a)]
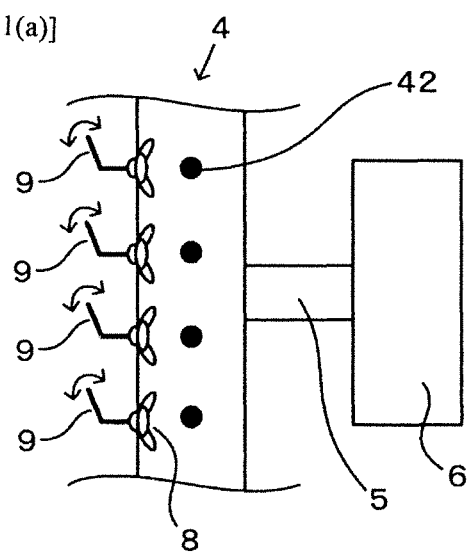
[Fig. 11(b)]
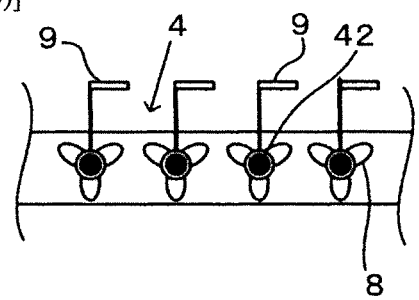

US 10,946,582 B2

METHOD FOR PRODUCING A THREE-DIMENSIONAL SHAPED PRODUCT

TECHNICAL FIELD

The present invention relates to a method for producing a three-dimensional shaped product wherein, during three-dimensional shaping, a suction device is provided which sucks in fumes, generated by irradiation with a laser beam or an electron beam onto a powder layer formed by traveling of a squeegee, over the entire periphery of a shaping table.

BACKGROUND OF THE INVENTION

In three-dimensional shaping in which powder layers are irradiated with the laser beam or the electron beam, the irradiation unavoidably generates smoky fumes.

Such fumes are collected by a fume collector installed outside of a three-dimensional shaping chamber, but in prior arts, a single suction device is provided in communication with the fume collector, being disposed at a position above the shaping table where the three-dimensional shaped product is mounted, and along a specified straight linear direction in the outer region of the shaping table, with the horizontal direction as reference.

Actually, in Patent Document 1, an exhaust port V1 disposed on a wall section of a chamber 1A at a location above and outside a shaping table 4 serves as a suction device sucking fumes in the chamber 1A by a fan 3B, and it is disposed at the wall section in a straight linear manner in a direction perpendicular to a plane of FIG. 1, and in communication with a fume collector 3A (see paragraph [0023], FIG. 2 and FIG. 3).

In Patent Document 2 as well, fumes generated by sintering by irradiation of the laser beam are sucked through a suction port 72b installed in a holder 43 communicating with a fume collector 19, and are discharged from a cover unit exhaust port 72a communicating with the fume collector 19 through a duct box 21 (see paragraphs [0061], [0063], FIG. 1 and FIG. 15).

The suction port 72b is also disposed in a straight linear manner in a direction perpendicular to a plane of FIG. 1.

As in these prior art cases in which s the suction device is disposed at above the shaping table and in a specific straight linear direction above and outside of the shaping table with the horizontal as reference, the direction along which the fumes are sucked is also determined as a direction that is approximately perpendicular to the straight linear direction, and there is unavoidable deviation (variation) in a distance between an irradiation position on the powder layers and the suction device, as the irradiation position moves.

When the irradiation position and the suction device are positioned on opposite sides with reference to the center location of the shaping table, their relative mutual distance increases, and fume suction speed must be slowed.

Considering such a situation, when the irradiation shifts to another position after the laser beam or the electron beam has already generated the fumes, the movement that takes place while the fumes are floating above the other irradiation position makes it unavoidable for the laser beam or the electron beam to need to pass through the fumes.

Such passage through floating fumes inevitably disturbs subsequent irradiation on each of the powder layers.

In addition, since degree of disturbance to the irradiation depends on the amount of fumes passed through, it is impossible to avoid the problem of deviation in irradiation.

This problem also leads to deviation in degree of sintering in the three-dimensional shaped product, and thus such deviation leads to reducing quality of the three-dimensional shaped product.

PRIOR ART DOCUMENTS

Patent Documents

Patent Document 1: Japanese Published Unexamined Patent Application No. 2018-72926
Patent Document 2: Japanese Published Unexamined Patent Application No. 2017-206744

SUMMARY OF INVENTION

Technical Problem

It is an object of the present invention to provide a method for producing a three-dimensional shaped product wherein a fume suction device is disposed and operational command for suction is carried out, in such a manner that permeation and irradiation of the laser beam or the electron beam is not disturbed by the fumes drifting over powder layers.

Solution to Problem

In order to solve the aforementioned problems, the present invention has following basic constructions:

(1) A method for producing a three-dimensional shaped product which employs a forming process in a shaping region, comprising dispersion of powder by a squeegee on a shaping table disposed within a chamber and irradiation of powder layers formed by the dispersion with a laser beam or an electron beam, wherein a suction device that communicates with a collector that collects fumes generated from the powder layers due to the irradiation and that suctions the fumes, is set at an upper side of the shaping table and surrounding an entire periphery of the shaping table with standard of horizontal direction, and suction operation by the suction device is continued during a period in which irradiation by the laser beam or the electron beam is continued.

(2) A method for producing a three-dimensional shaped product which employs a forming process in a shaping region, comprising dispersion of powder by a squeegee on a shaping table disposed within a chamber and irradiation of powder layers formed by the dispersion with a laser beam or an electron beam, wherein a suction device that communicates with a collector that collects fumes generated from the powder layers due to the irradiation and that sucks the fumes, is set at upper side of the shaping table and surrounding an entire periphery of the shaping table with standard of horizontal direction, while suction zones that achieve independent suction work by the suction device are situated at equal intervals with a suction reference position specified at a center location of each suction zone, a common operating time range is set for each suction zone, and multiple resting irradiation reference positions are set based on regularly arranged positions at equal intervals in a two-dimensional direction for each powder layer, or alternatively, multiple moving irradiation reference positions are set in irradiation positions that move within each powder layer, with unit of moving time where the moving time is a time range set for each suction reference position from the initial irradiation position, and after judging an irradiation reference position P that is currently irradiated among the multiple resting or moving irradiation reference positions, the suction reference position at the shortest distance from the irradiation reference position P is selected, and an operational command for suction is sent to the selected suction zone corresponding to the suction reference position.

(3) A method for producing a three-dimensional shaped product which employs a forming process in a shaping region, comprising dispersion of powder by a squeegee on a shaping table disposed within a chamber and irradiation of each powder layer formed by the dispersion with a laser beam or an electron beam, wherein a suction device that communicates with a collector that collects fumes generated from the powder layers due to the irradiation, and that sucks the fumes, is set at upper side of the shaping table and surrounding an entire periphery of the shaping table with standard of horizontal direction, while suction zones that achieve independent suction work by the suction device are situated at equal intervals with a suction reference position being specified at a center location of each suction zone, a common operating time range is set for each suction zone, and multiple resting irradiation reference positions are set based on regularly arranged positions at equal intervals in two-dimensional direction for each powder layer, and after judging an irradiation reference position P that is currently irradiated among the multiple resting irradiation reference positions, an adjacent irradiation reference position P' calculated by a time within the time range is set according to traveling direction and traveling speed of an irradiation position at the irradiation reference position P, or multiple moving irradiation reference positions are set for the irradiation position moving within each powder layer with unit of moving time where the moving time is a time range set for each suction reference position from the initial irradiation position, and after judging an irradiation reference position P that is currently irradiated among the multiple moving irradiation reference positions, the irradiation reference position P and an adjacent irradiation reference position P' that is expected to move from the irradiation reference position P through a time based on the time range are set, while operational command for suction is sent to a suction zone corresponding to each suction reference position at a position on a side opposite from the adjacent irradiation reference position P' based on a straight line at the irradiation reference position P which is perpendicular to a straight line connecting the irradiation reference positions P and P'.

Advantageous Effects of Invention

In the basic construction (1), suction devices are set in a state surrounding the entire periphery of the shaping table, so that a nearest suction device exists in all of the regions other than the center location of the shaping table, and the center location is also in a definite state with a short distance between the center location and each suction device compared to the distance between the suction device and the region located on the opposite side from the suction device with the center location compared with a construction in which one straight linear suction device is installed, as in the prior art.

In the basic construction (1), therefore, an average value for the distance between the irradiation position and the suction device is shorter than in the prior art, and the deviation in the distance can also be reduced.

As a result, it is possible to reduce disturbance for subsequent irradiation after the laser beam or the electron beam has passed through the drifting fumes, as mentioned in regard to the background art.

In the basic construction (2), by suction of fumes in a region surrounding the position of the suction device that is at the shortest distance from the center location of the irradiation reference position, it is possible to suck the fumes at a speed that is definitely greater than the traveling speed of the irradiation position, thus making it possible to adequately prevent the disturbance to irradiation of the laser beam or the electron beam by the fumes drifting.

In the basic construction (3), the fumes can be sucked in the opposite direction from the traveling direction of the position of the irradiation with the laser beam or the electron beam, making it possible to completely prevent the disturbance to irradiation of the laser beam or the electron beam by drifting of the fumes.

BRIEF DESCRIPTION OF DRAWINGS

FIG. 1 is a plan view of Example 1. The dotted line on the inner side of the suction device represents a presence of a gap on the side of the shaping table where suctioning is carried out.

FIG. 2 is a plan view of Example 2. The dotted line on the inner side of the suction device has the same meaning as in FIG. 1.

FIGS. 3(a) and 3(b) illustrate the state of the suction devices disposed in the basic constructions (1), (2), (3), where FIG.(a) is a side view and FIG. 3(b) is a plan view. The dotted line on the inner side of the suction device has the same meaning as in FIG. 1.

FIGS. 4(a) and 4(b) are plan cross-sectional views illustrating how the irradiation reference position is set in the basic construction (2), where FIG. 4(a) shows a case where multiple irradiation reference positions are set based on regularly arranged positions at equal intervals in the two-dimensional direction for each powder layer, and FIG. 4(b) shows a case where the multiple irradiation reference positions are set for the irradiation position that moves within the powder layer, based on the moving time in the aforementioned common time range for each suction reference position, with the moving time from the initial irradiation position as the unit. The gaps between the solid lines on the inner side of the suction device represent the presence of suction holes corresponding to each suction zone. Also, P represents the irradiation reference position where irradiation is currently being carried out.

FIG. 5(a) is a flowchart for all of the control processes, explaining the control process of the basic construction (2).

FIG. 5(b) is a flow chart for selection of the suction reference position necessary for the operational command for suction, explaining the control process of the basic construction (2).

FIG. 5(c) is a flow chart for selection of the suction reference position necessary for the operational command for suction, explaining the control process of the basic construction (2).

FIG. 6 is a plan view of the basic construction (2), accompanied with a graph showing the configuration of each suction zone and each suction reference position, as a basis for the flow chart of FIG. 5(c).

FIGS. 7(a) and 7(b) are plan cross-sectional views illustrating how the irradiation reference position is set in the basic construction (3), where FIG. 7(a) shows a case where the multiple irradiation reference positions are set based on regularly arranged positions at equal intervals in the two-dimensional direction for each powder layer, and FIG. 7(b) shows a case where the multiple irradiation reference positions are set for the irradiation position that moves within the powder layer, based on the moving time in the aforementioned common time range for each suction reference position, with the moving time from the initial irradiation position as the unit. The gaps between the solid lines on the inner side of the suction device represent the presence of the suction holes corresponding to each suction zone. Also, P represents the irradiation reference position where irradiation is currently being carried out, and P' represents the adjacent irradiation reference position.

FIG. 8(a) is a flow chart for all of the control processes explaining the control process of the basic construction (3).

FIG. 8(b) is a flow chart for selection of the suction reference position necessary for the operational command for suction, explaining the control process of the basic construction (3).

FIG. 8(c) is a flow chart for selection of the suction reference position necessary for the operational command for suction, which describes the control process of the basic construction (3).

FIGS. 9(a) and 9(b) show an embodiment of the basic construction (2) and (3) in which each suction zone is set by connected state without demarcation and respective opening and closing valves corresponding to each suction zone are set in an adjacent state, FIG. 9(a) is a plan view and FIG. 9(b) is a side view. The vertical arrows in (b) represent the traveling direction of the opening and closing valves. The horizontal dotted lines in FIG. 9(a) and the vertical dotted lines in FIG. 9(b) represent border lines of the suction zones in which suction operation can be carried out independently.

FIGS. 10(a)-10(c) shows an embodiment of the basic constructions (2) and (3) in which each demarcated suction zone is set by mutually adjacent state and each opening and closing valve corresponding to each suction zone is set by adjacent state, where FIG. 10(a) is a plan view of a case wherein the opening and closing valves are set at the suction zone entrances, FIG. 10(b) is a plan view of a case wherein the opening and closing valves are set midway in each pipe allowing communication between each suction zone and a fume collector, and FIG. 10(c) is a plan view wherein the opening and closing valves are provided at the ends on the fume collector sides of pipes allowing communication between the suction zones and the fume collector.

FIGS. 11(a) and 11(b) show an embodiment of the basic constructions (2) and (3) in which respective suction fans and respective suction switches connected to the suction fans are set at each demarcated suction zone, where FIG. 11(a) is a plan view and FIG. 11(b) is a lateral cross-sectional view.

DESCRIPTION OF THE PREFERRED EMBODIMENTS

In the basic constructions (1), (2), (3) which are required process of dispersing powder on a shaping table 1 and process of irradiating the laser beam or the electron beam on each powder layer 3 formed by the dispersion, as shown in FIGS. 3(a) and (b), a suction device 4 communicating with fume collectors 6 is set above the shaping table 1 and surrounding the shaping table 1 with the horizontal direction as reference, which clearly differs from a construction with setting in a straight linear manner in a specific direction, as in the prior art.

However, in providing the suction device 4 by state of surrounding the shaping table 1, by providing the fume collector 6 at a single location as in the prior art, the distance of a pipe 5 from the suction device 4 to the fume collector 6 becomes larger, so plural fume collectors such as, for instance in the case of a rectangular shaping table 1, four fume collectors 6 should be set as shown in FIG. 3(b).

In FIG. 3(a) and (b), an irradiation source by the laser beam or the electron beam and the reflective mirror for each beam are not shown.

FIG. 3(a) and (b) illustrate an embodiment in which the suction device 4 is provided in the chamber, but an embodiment may also be selected for the basic constructions (1), (2), (3) in which the suction device 4 is provided on a chamber wall section 2 similar to Patent Document 1.

The basic constructions (1), (2), (3) naturally include a construction in which a cutting process is employed on the surface and vicinity of a sintered layer of the three-dimensional shaped product after it has been formed by irradiation, but it is not always essential to carry out the cutting process.

The cutting process is considered to be essential, however, in order to ensure the accurate shape of the three-dimensional shaped product.

In the case of the basic construction (1), the suction device 4 operates uniformly over the entire region during the time in which three-dimensional shaping is carried out as in the prior art, but in the case of the basic constructions (2) and (3), a position is selected and varied for carrying out the suction operation corresponding to change in the irradiation position on the sintered layer.

In the basic constructions (2) and (3), therefore, suction zones 41 are set by which the suction operations can be independently carried out at equal intervals in the suction device 4 while a suction reference position 42 is set at the center location of each suction zone 41, and the reason for above setting is grounded that the operating position of the suction device 4 can be rapidly selected to correspond to change in the irradiation position based on the suction reference position 42.

In contrast, for the basic construction (1), the suction operation is carried out uniformly, and so it is unnecessary to set each suction zone 41 capable of independently carrying out the suction operation.

In order to exhibit an independent suctioning function for each suction zone 41, it is necessary that each suction zone 41 communicates with the fume collector 6 through each pipe 5 equipped corresponding to each suction zone 41, or it is otherwise necessary that an opening and closing valve 7 equipped corresponding to each suction zone 41 works as described below.

In FIG. 4(a) and (b) and FIG. 7(a) and (b), suction holes are employed corresponding to each suction zone 41 independently carrying out suction operation, but the suction holes 43 are not essential and it is sufficient if a gap is present for suctioning on the shaping table 1 side of each suction zone 41.

The operating time for each suction zone 41 is determined by the degree of change in the irradiation position, but the operating time is set to be a prescribed time range for more convenient control.

The time range will differ depending on a size and shape of the three-dimensional shaped product, but usually requiring a time of 10 seconds to 1 minute will be sufficient.

In the case of the basic construction (2), the fumes are sucked by operation of a single suction zone 41, and in the case of the basic construction (3) as well, there will naturally be cases in which only the single suction zone 41 is present in the direction opposite from the traveling direction of the irradiation position.

For operation with such a single zone, the effect of the basic constructions (2) and (3) can be obtained even when the fumes are generated at the center location of the shaping table 1, so long as it is possible to suck the fumes individually by suction force with each suction zone 41 as the unit.

Because, in the basic constructions (2) and (3) as well, as long as the irradiation position for each powder layer 3 at the furthest distance from each suction zone 41 is the center location of the shaping table 1 similar to the basic construction (1), then when the irradiation position where irradiation is currently being carried out has moved further from the center location in each suction zone 41, it will definitely be possible to carry out more powerful suction than during irradiation at the center location.

In the basic constructions (2) and (3), multiple irradiation reference positions 31 are set by the following A in FIG. 4(*a*) and FIG. 7(*a*) and the following B in FIG. 4(*b*) and FIG. 7(*b*).

A. Multiple stationary irradiation reference positions 31 based on regularly arranged positions at equal intervals in the two-dimensional direction of each powder layer 3.

B. Multiple moving irradiation reference positions 31 with unit of moving time where the moving time is a time range set for each suction reference position 42 from the position at the start of movement at an irradiation position that moves for each powder layer 3.

The multiple resting irradiation reference positions 31 are set in process A, because in the sintering region wherein each powder layer 3 is irradiated with the laser beam or the electron beam, all of the stationary irradiation reference positions 31 mentioned above will definitely be irradiated.

Therefore, in order to detect the irradiation reference position P that is currently being irradiated from among the multiple resting irradiation reference positions 31 of process A, it is essential to judge the irradiation reference position 31 among the multiple irradiation reference positions 31 according to judgement on which the laser beam or electron beam moves and during any of period within the entire irradiation time, and so it is possible to determine the irradiation reference position P by such a judgement.

The laser beam or the electron beam is not always moved to the multiple arrangement positions of process A according to a regular timing.

However, the irradiation reference position P determined by the judgement corresponds to one of the regularly arranged multiple resting irradiation reference positions 31.

The multiple moving irradiation reference positions 31 of process B are not arranged at equal intervals as in A.

Therefore, in the multiple moving irradiation reference positions 31 of process B, it is essential to judge where the irradiation reference position P of the time unit is present at location of each powder layer 3.

Considering that the irradiation position moves successively through the sintering region of each powder layer 3 in a uniform manner as long as setting is from the initial movement period with the time in the suction time range for suction as the unit, then it is possible to set the irradiation reference position 31 in an approximately uniform state for each powder layer 3 at a regular time.

In the basic construction (3), in order not only to establish the irradiation reference position P that is currently being irradiated but also to establish the traveling direction of the laser beam or electron beam at the irradiation reference position P, the adjacent irradiation reference position P' is set by the following a position as shown in FIG. 7(*a*) or the following β position as shown in FIG. 7(*b*).

α. A position calculated by the time of time unit in process B based on the traveling direction and traveling speed of the irradiation position at irradiation reference position P set by process A.

β. A position where movement is predicted from the irradiation reference position P set by process B through the time unit of process B.

When the irradiation position by the laser beam or the electron beam moves through the irradiation reference position P set by process A, the traveling direction and traveling speed are definitely determined.

In process α, the adjacent irradiation reference position P' is set by the time unit of process B based on this traveling direction and traveling speed, but actually, considering that actual irradiation position may move in succession, the irradiation position does not necessarily pass or move through the adjacent irradiation reference position P' that is set as above.

However, it is clear that the adjacent irradiation reference position P' calculated by process a reflects and determines the traveling direction of the irradiation position for the irradiation reference position P.

As long as it is expected that the irradiation reference position P in which irradiation is actually carried out and the adjacent irradiation reference position P' as set by process β actually move through the time unit of process B from the irradiation position of the actual movement, then there is no room for doubt in determining the traveling direction for the irradiation reference position P.

In the basic construction (2) shown as the plan cross-sectional views of FIG. 4(*a*) and (*b*), for selection of the suction reference position 42 which is at the shortest distance from the center location of the irradiation reference position 31 where irradiation is being carried out and for operational command for the suction device 4 surrounding the suction reference position 42, as shown in the flow chart of FIG. 5(*a*), the shape of the three-dimensional shaped product is set by a CAD/CAM system and N number of powder layers 3 to be laminated by the squeegee are set, upon which the following processes are employed:

1. Setting the multiple resting irradiation reference positions 31 for process A or the multiple moving irradiation reference positions 31 for B.
2. Judging the irradiation reference position P that is currently being irradiated among the multiple irradiation reference positions 31 set in process 1.
3. Selecting the suction reference position 42 at the shortest distance from the irradiation reference position P.
4. Sending an operational command for suction in the suction zone 41 corresponding to the suction reference position 42 selected by process 2.

Actuality, selecting the suction reference position 42 that is at the shortest distance from the center location can be achieved by an embodiment with following processes as shown in the flow chart of FIG. 5(*b*) : 1. Calculating distances between the irradiation reference position P in polar coordinates (r, θ) with the center location of the shaping table as the origin and all of suction reference positions 42.

2. Comparing, as shown in FIG. 4(*a*) and (*b*), magnitude relationship of the distance calculated in process 1 with suction reference positions 42 that present either in clockwise direction as a direction in which θ decreases as shown in FIG. 4(*a*) or counterclockwise direction as a direction in which increases as shown in FIG. 4(*b*) with respect to a suction reference position S arbitrarily selected as a start position and that have not yet been compared.

3. On the comparison in process 2, selecting one of the two suction reference positions 42 which is the suction reference position 42 having a smaller distance than the other one, or selecting either of the two suction reference positions 42 when the suction reference positions 42 have equal distances. 4. Repeating comparison in process 2 and selection in process 3 are repeated until the comparison of process 2 and the selection of process 3 performed in the counter-clockwise direction or the clockwise direction with respect to the suction reference position 42 specified in process 2 reaches the adjacent suction reference position S' as shown in FIG. 4(*a*) and (*b*).

For the irradiation reference position P that is currently being irradiated, in consideration of the presence of the prescribed region width, the irradiation reference position P in process 1 is intended to be the "center location of the irradiation reference position P", using the irradiated sintering region as reference.

However, when a computer is used for control of three-dimensional shaping, serving for essential recording and control of the center location of the irradiation reference position P, the irradiation reference position P of the basic construction (2) is necessarily the "center location of the irradiation reference position P", and it conforms to a technical meaning that is based on the irradiated sintering region.

In process 3. above, either of the two suction reference positions 42 may be selected when both suction reference positions 42 have equal distances, and the selection will not affect operation of the subsequent process.

The comparison is executed between the magnitude relationships of the distances of the successive currently moving irradiation reference position P in the clockwise or counter-clockwise positions, from the specified suction reference position 42 that is selected, then it will be possible to smoothly select the suction reference position 42 by using polar coordinates (r, θ).

In the case of orthogonal coordinates (x, y), incidentally, it is necessary to perform a complex procedure of specifying a specific coordinate position (X', Y') that is adjacent to a specific coordinate position (X, Y), and judging whether the coordinate positions (X, Y) and (X', Y') are in the clockwise direction or in the counter-clockwise direction, and it is impossible to determine these uniformly as with polar coordinates (r, θ) in the clockwise or counter-clockwise direction.

The embodiment described above in which such a successive procedure is assumed, is characterized in that the shortest distance from the irradiation reference position P can be calculated regardless of the state of arrangement of each suction zone 41 and each suction reference position 42 corresponding to the suction zone 41.

As shown in FIG. 4, a common shaping table 1 has a rectangular planar shape along the horizontal direction, and therefore the suction device 4 is also arranged along the rectangular sides.

In such a case, selection of the suction reference position 42 that is at the shortest distance from the center location is possible by the following process, as shown in the graph with orthogonal coordinates (x, y) in FIG. 6 and the flow chart in FIG. 5(*c*).

1. At the orthogonal coordinates (x, y) with the center location of the shaping table as an origin, selecting an x-axis and y-axis that are parallel to the rectangular sides, and judging the coordinates (a, b) of the irradiation reference position P that is currently being irradiated.

2. Setting four coordinates (A, b), (−A, b), (a, B), (a, −B) in which straight lines parallel to the x-axis direction and y-axis direction from coordinates (a, b) crossing with the openings of the suction device 4.

3. Selecting the shortest distance among A−a, A+a, B−b and B+b which are distances between the position of coordinates (a, b) and the four coordinates.

4. Selecting the suction reference position 42 having the minimum distance with respect to the coordinate position selected in process 3.

For selection of the coordinate with the smallest numerical value among the 4 distances in process 3, it is not necessarily essential to set the polar coordinates (r, θ) as in the embodiment shown in FIG. 5(*b*), so long as the number of comparisons is (4×3×2×1)/(2×2)=6 times.

For the 4 coordinate positions as well, however, after the polar coordinates (r, θ) have been set, the distances from the successive suction reference positions 42 can be compared, as in the flow chart of FIG. 5(*b*), and since the number of comparisons is no more than four in this case, it is possible to carry out speedy comparison.

In process 1, therefore, the construction employing polar coordinates (r, θ) instead of orthogonal coordinates (x, y) is technically identical to the construction of the flow chart of FIG. 5(*c*), and the embodiment of FIG. 5(*c*) thus includes an embodiment that employs polar coordinates (r, θ), in terms of its technical scope.

When orthogonal coordinates (x, y) are employed, as shown in FIG. 6, it is judged whether the rectangular side where the coordinates selected by process 3 are present is along the x-axis direction or y-axis direction, and when it is along the x-axis direction, it is necessary to make successive comparison of the magnitude relationship for the absolute value of the difference X'—a between the numerical value X' of the x coordinate of each suction reference position 42 and the numerical value a of the coordinate, or when the rectangular side is along the y-axis direction in process 3, it is essential to make successive comparison of the absolute value of the difference Y'—b between the numerical value Y' of the y-axis of the suction reference position 42 of that side and the numerical value b of the coordinate, so that the process is somewhat more complex than for polar coordinates (r, θ) obtained with the same comparison in the flow chart of FIG. 5(*b*).

Such a condition for orthogonal coordinates (x, y) objectively supports the aforementioned technical equality relationship.

Specifically, in the case of the basic construction (2), as an exception, there are several suction reference positions 42 having the shortest distance from the center location of the shaping table 1.

More specifically, when the shaping table 1 has a rectangular shape, for example, two suction reference positions 42 are formed that are expected to have the shortest distance from the center location, or when the shaping table 1 is square and the ends of the shaping table 1 are equidistant from the suction device 4 openings as in Example 1 described below, four suction reference positions 42 are formed having the shortest distance from the center location of the shaping table 1, or when the shaping table 1 is circular as in Example 2 described below and the openings of the suction device 4 are all concentric with the circular shape, all of the suction reference positions 42 must be the shortest distance from the center location.

However, when the time during which the irradiation reference position 31 actually moves through the center location of the shaping table 1 is a short period of time and multiple suction reference positions 42 exist that are the shortest distance, then as long as suction is carried out in multiple directions, the amount of fumes in each direction is less than in a single direction, and therefore it is still possible to ensure the effect of sufficiently preventing the drift of fumes from disturbing permeation and irradiation of the laser beam or electron beam.

In the basic construction (3) shown as plan cross-sectional views of FIG. 7(a) and (b), the following process is employed with the shape of the three-dimensional shaped product set by a CAD/CAM system and N number of powder layers 3 to be laminated by the squeegee set, as shown in the flow chart of FIG. 8(a).

1. Setting multiple resting irradiation reference positions 31 for process A or multiple moving irradiation reference positions 31 for process B.
2. Judging the irradiation reference position P that is currently being irradiated among the multiple irradiation reference positions 31 set in process 1.
3. Setting the adjacent irradiation reference position P' by processes α or β.
4. Setting a line equation, for the line perpendicular at the irradiation reference position P with respect to a straight line connecting the irradiation reference positions P and P', based on processes 2 and 3.
5. Sending an operational command for suction in the suction zone 41 corresponding to the suction reference position 42 present in the region on the side opposite the adjacent irradiation reference position P' set by process 3, with the perpendicular straight line of process 4 as reference.

Specific selection of the suction reference position 42 present on the side opposite from the adjacent irradiation reference position P' can be made by the following process, as shown in the flow chart of FIG. 8(b).

1. Setting an equation for the perpendicular line:

$$r \cos \theta/_a + r \sin \theta/_b = 1$$

in polar coordinates (r, θ) with a center location of the shaping table as the origin, as shown in FIG. 7(a) and (b), wherein a and b are respectively r at angles θ=0 and θ=π/2, in the case that coordinates of the irradiation reference position P that is currently being irradiated are (R, α) and the coordinates of the adjacent irradiation reference position P' are (R', α'), then $$a = \{R \cdot R' \cos(a-a') - R^2\}/(R' \cos a' - R \cos a)$$

$$b = \{R \cdot R' \sin(a-a') - R^2\}/(R' \sin a - R \sin a)$$

applied.

2. Judging magnitude relationship between $$R' \cos a'/_a + R' \sin a'/_b > 1$$

and 1 for the adjacent irradiation reference position P' (R', α').

3(1) In the case of $$R' \cos a'/_a + R' \sin a'/_b > 1$$

in process 2, selecting a suction reference position 42 with satisfying:

$$R'' \cos a''/_a + R'' \sin a''/_b \leq 1$$

for the coordinates (R", α") of each suction reference position 42.

(2) In the case of $$R' \cos a'/_a + R' \sin a/_b < 1$$

in process 2, selecting all of the suction reference positions 42 with satisfying $$R'' \cos a''/_a + R'' \sin a''/_b \geq 1$$

for coordinates (R", α") of each suction reference position 42.

When all of the suction reference positions 42 selected in 3(1) and (2) above are based on the perpendicular straight line set in process 1, then being on the side opposite from the adjacent irradiation reference position P' is immediately apparent by elementary mathematics based on the magnitude relationship between $$R' \cos 'a/_a + R' \sin a'/_b$$

which is the equation for the perpendicular straight line, and 1.

For derivation of the general equation for processes a and b, the equation:

$$r\{R' \sin(\theta - a') - R \sin(\theta - a)\} = R \cdot R' \sin(a - a')$$

applies, for a straight line connecting the irradiation reference position P where irradiation is being carried out (R, α) and the adjacent irradiation reference position P' (R', α').

Therefore, the line equation passing through the irradiation reference position P (R, a) and perpendicular to the line equation:

$$r\{R' \cos(\theta - a') - R \cos(\theta - a)\} = R \cdot R' \cos(a - a') - R^2$$

may be derived.

Since this can be converted to the line equation:

$$r\{(R' \cos a' - R \cos a)\cos \theta + (R' \sin a' - R \sin a)\sin \theta\}/\{R \cdot R' \cos(a-a') - R^2\} = 1$$

following equations may be derived as a and b:

$$a = \{R \cdot R' \cos(a-a') - R^2\}/(R' \cos a - R \cos a)$$

$$b = \{R \cdot R' \sin(a-a') - R^2\}/(R' \sin a'' - R \sin a)$$

The flow chart of FIG. 8(b) was explained by using polar coordinates (r, θ), but by employing orthogonal coordinates (x, y) as shown in FIG. 7(a) and (b), it is possible to set x/a+y/b=1 by setting coordinates (a, 0) and (0, b) running through the x-axis and y-axis, for the perpendicular straight line running through irradiation reference position P.

When these are set, then naturally it is possible to judge the magnitude relationship between X'/a+Y'/b for the adjacent irradiation reference position P' (X', Y') and 1, and to select all of the suction reference positions 42 (x",y") in each of which the magnitude relationships between X'/a+Y'/b and 1 is magnitude relationship opposite from P' (X', Y').

That is, the embodiment shown in the flow chart of FIG. 8(b) is technically equivalent to the calculation equation employing orthogonal coordinates as described above, and an embodiment by such a calculation equation is naturally included within the technical scope.

But when all of the suction reference positions 42 that satisfy the reverse inequality from the inequality for the adjacent irradiation reference position P' (X', Y') are to be selected, using polar coordinates (r, θ) allows more efficient judgement and selection by successively varying θ" angles, and considering that in the case of orthogonal coordinates (x, y), it is necessary to successively judge the validity of the reverse inequality after the numerical values for X" and Y" of the coordinate (X", Y") have been individually varied for each suction reference position 42, using orthogonal coordinates (X, Y) is somewhat more inconvenient for efficient selection of the suction reference position 42.

This somewhat inconvenient situation, however, can naturally be foreseen by a person skilled in the art, and therefore does not constitute a reason for denying its technical equivalence.

The embodiment shown in the flow chart of FIG. 8(b) has the feature of a simple construction in which each suction reference position 42 is individually judged as to whether it is or is not in the opposite direction from the direction from the adjacent irradiation reference position 31.

Another embodiment of selecting the suction reference position 42 on the side in the opposite direction from the adjacent irradiation reference position P', can be by the following process, shown in the flow chart of FIG. 8(c).

1. Setting an equation for the perpendicular straight line:

$$r \cos \theta/_a + r \sin \theta/_b = 1$$

in polar coordinates (r, θ) with a center location of the shaping table as the origin, as shown in FIG. 7(a) and (b), wherein a and b are respectively r at angles θ=0 and θ=π/2, and in the case that coordinates of the irradiation reference position P that is currently being irradiated are (R, α) and the coordinates of the adjacent irradiation reference position P' are (R', α'), then $$a = \{R \cdot R' \cos(a-a') - R^2\}/(R' \cos a' - R \cos a)$$

$$b = \{R \cdot R' \sin(a-a') - R^2\}/(R' \sin a' - R \sin a)$$

is applied.

2. Calculating two intersections $Q_1$ ($R_1'$, $\alpha_1'$) and $Q_2$ ($R_2'$, $\alpha_2'$) between the line equation and lines at the suction device openings, as shown in FIG. 7(a) and (b), wherein $Q_1$ is a position to the left, or above, or the top left side with respect to $Q_2$ (In FIG. 7(a) and (b), $Q_1$ is shown at the top left side with respect to $Q_2$).

3. Judging the magnitude relationship between $$R' \cos a'/_a + R' \sin a'/b$$

and 1 for the adjacent irradiation reference position P' (R', α').

4(1) In the case of $$R' \cos a'/_a + R' \sin a'/_b > 1$$

in process 3, successfully selecting suction reference positions 42 that are present in the range up to $Q_2$ in the counter-clockwise direction which is the direction from $Q_1$ in which θ increases.

(2) In the case of $$R' \cos a'/_a + R' \sin a'/_b < 1$$

in process 3, successfully selecting suction reference positions 42 that are present in the range up to $Q_2$ in the clockwise direction which is the direction from $Q_1$ in which θ decreases.

In the case of the embodiment shown in the flow chart of FIG. 8(c), when a suction reference position 42 is selected in the clockwise direction or counter-clockwise from the two intersections $Q_1$ and $Q_2$, using orthogonal coordinates (x, y) requires very complex calculation, and therefore smoother selection of each suction reference position 42 can be executed by setting polar coordinates (r, θ) for each suction reference position 42, as is the embodiment shown in FIG. 4(b) for the basic construction (2).

In the embodiment shown in the flow chart of FIG. 8(c), when R'·cos α'/a+R'·sin α'/b>1, the suction reference position 42 present in the range up to the intersection $Q_2$ in the counter-clockwise direction from $Q_1$ is selected by the reason that with reference to the perpendicular straight line, the counter-clockwise and clockwise directions are opposite from the directions toward the adjacent irradiation reference position P' which satisfies R'·cos α'/a+R'·sin α'/b>1.

Likewise, when R'·cos α'/a+R' ·sin α'/b>1, the suction reference position 42 present in the range up to the intersection $Q_2$ in the clockwise direction from $Q_1$ is selected by the reason that with reference to the perpendicular straight line, the clockwise and counter-clockwise directions are opposite from the directions toward the adjacent irradiation reference position P' which satisfies R'·cos α'/a+R'·sin α'/b<1.

The embodiment shown in the flow chart of FIG. 8(c) has the feature of allowing the suction reference position 42 that is in the opposite direction from the adjacent set irradiation reference position 31 to be selected at one time, by selection in the clockwise or counter-clockwise direction from the two intersections $Q_1$ and $Q_2$.

FIG. 9(a) and (b) show an embodiment characterized in that the suction device 4 has each suction zone 41 arranged in a connected manner without division, and an opening and closing valve 7 corresponding to each suction zone 41 is provided mutually adjacent to an entrance of each suction zone 41, and moreover the opening and closing valve 7 is opened at the suction zone 41 to which an operational command for suction is executed.

In this embodiment, using each suction zone 41 in a simple construction without demarcation and its adjacent opening and closing valve 7 allows appropriate setting of the suction reference position 42 and selection of the suction reference position 42 for the basic constructions (2) and (3).

FIG. 10 shows an embodiment characterized in that respective suction zones 41 of the suction device 4 are arranged with a mutually divided state, while the opening and closing valve 7 corresponding to each suction zone 41 is installed at the entrance of the suction zone 41, or at midway in each pipe 5 connecting each suction zone 41 with the fume collector 6, or at the end on the fume collector 6 side, and the opening and closing valve 7 of the suction reference position 42 to which an operational command for suction is sent for opening.

Since this embodiment is provided with an already divided suction zone 41 and a suction reference position 42 corresponding to the suction zone 41, moreover the opening and closing valve 7, it is possible to appropriately meet the suction reference position 42 and select the suction reference position 42 for the basic constructions (2) and (3).

Moreover, in this embodiment, the set locations of the opening and closing valves 7 may be selected at 3 different locations, and setting the opening and closing valve 7 within the pipe 5 communicating with the fume collector 6, as shown in FIG. 10(b) and (c), so it is possible to avoid placing the device that drives each opening and closing valve 7 at the opening of the suction device 4 or its vicinity, thus safe operation may be executed.

FIG. 11 shows an embodiment characterized in that respective suction zone 41 of the suction device 4 is arranged in a mutually divided state, while a suction fan 8 and a suction switch 9 connected to the suction fan 8 are installed in each suction zone 41, and the suction switch 9 and suction fan 8 are operated for the suction zone 41 to which an operational command for suction is executed.

In this embodiment, the unit for operation required for the suction reference position 42 is not an opening and closing valve 7 but rather a suction fan 8 having a separate suction switch 9, and therefore the design is somewhat more complex than the embodiments shown in FIGS. 9 and 10.

But, the embodiment shown in FIG. 11 can carry out suction of fumes by the suction fan 8 of each suction zone 41 and their movement to the fume collector 6, allowing the space for the fume collector 6 to be reduced since it is not necessary to provide a large suction fan 8 for the fume collector 6.

A greater exposure dose by the laser beam or electron beam tends to result'in generation of more fumes.

From this viewpoint, it is possible to employ an embodiment in the basic constructions (1), (2), (3) which is characterized in that degree of suction per unit area of the suction device 4 is set to be greater in accordance with the greater amount of irradiation by the laser beam or the electron beam that is set.

In this embodiment, even when the exposure dose has increased and a greater amount of fumes has been generated, the fumes can be rapidly sucked by the increased degree of suction, and disturbance to permeation and irradiation of the laser beam or electron beam by fumes can be satisfactorily prevented.

In all of the basic constructions (1), (2), (3), the preferred embodiment is setting equal distance between ends of the shaping table 1 and the suction device 4 along the horizontal direction, as shown in FIG. 1 and FIG. 2.

This is because setting such equal distances further decreases deviation in the time during which fumes move from the position irradiated by the laser beam or electron beam to the suction device 4, compared to a design without equal distances.

The invention will now be explained by working examples.

EXAMPLE 1

Example 1 is characterized in that, in the basic constructions (1), (2), (3), a planar shape along the horizontal direction of the shaping table 1 is a square, as shown in FIG. 1, and the suction device 4 of the fume is arranged so as to form the square sides (FIG. 1 shows an embodiment with a demarcated suction device 4, as in FIG. 10).

As mentioned above, the shaping table 1 usually employs the square in the planar direction, along the horizontal, but Example 1 has the suction device 4 also arranged along square sides, following the shape of the shaping table 1.

Example 1 can be easily applied to an embodiment having equal distances between the ends of the shaping table 1 and the suction device 4, in the horizontal direction.

FIG. 1 shows a state in which the suction device 4 is not provided at locations where it is not parallel to the end of the shaping table 1, i.e. near the corners, but the suction device 4 may of course also be provided at the corners and their vicinity.

EXAMPLE 2

Example 2 is characterized in that, for the basic constructions (1), (2), (3), the planar shape along the horizontal direction of the shaping table 1 is circular, as shown in FIG. 2, and the suction device 4 is arranged concentrically with the circular shape (FIG. 2 shows an embodiment in which the suction device 4 is connected without divided region as is disclosed in FIG. 9).

The type of shaping table 1 of FIG. 2 is employed less frequently than a square shaping table 1.

In Example 2, however, arrangement in a concentric manner as shown in FIG. 2 allows the suction device 4 to be set over the entire region surrounding the shaping table 1 when the ends of the shaping table 1 and the suction device 4 are set to be equidistant in the horizontal direction, thus allowing space to be effectively utilized.

INDUSTRIAL APPLICABILITY

The present invention can prevent disturbance to permeation and subsequent irradiation of a laser beam or electron beam by fumes generated due to irradiation with the beam, and it therefore has remarkable significance in terms of reducing or preventing deviation in the quality of three-dimensional shaped products, and can be widely utilized for all constructions in three-dimensional shaping.

REFERENCE SIGNS LIST

1 Shaping table
2 Chamber wall section
3 Powder layer to be irradiated
31 Irradiation reference position
4 Suction device
41 Suction zone
42 Suction reference position
43 Suction hole
5 Pipe
6 Fume collector
7 Opening and closing valve
8 Suction fan
9 Suction switch

What is claimed is:

1. A method for producing a three-dimensional shaped product which employs a forming process in a shaping region, comprising the steps of:
    dispersion of powder by a squeegee on a shaping table disposed within a chamber,
    irradiation of powder layers formed by the dispersion with a laser beam or an electron beam,
    setting a suction device that communicates with a collector that collects fumes generated from the powder layers due to the irradiation and that sucks the fumes, at an upper side of the shaping table and surrounding an entire periphery of the shaping table in reference to a horizontal direction,
    situating suction zones of the suction device that achieve independent suction work by the suction device at equal intervals with a suction reference position specified at a center location of each suction zone,
    setting a common operating time range for each suction zone,
    one of:
        setting multiple resting irradiation reference positions based on regularly arranged positions at equal intervals in a two-dimensional direction for each powder layer,
        setting multiple moving irradiation reference positions in irradiation positions that move within each powder layer,
    with unit of moving time where the moving time is a time range set for each suction reference position from an initial irradiation position,
    selecting, after judging an irradiation reference position P that is currently irradiated among the multiple resting or moving irradiation reference positions, the suction reference position at the shortest distance from the irradiation reference position P, and sending an operational command for suction to the selected suction zone corresponding to the suction reference position.

2. The method for producing a three-dimensional shaped product according to claim 1, wherein the step of selecting the suction reference position at the shortest distance from the irradiation reference position P in which the irradiation is currently undergone includes the following steps:
 1. calculating distances between the irradiation reference position P in polar coordinates (r, θ) with the center location of the shaping table as the origin and all of suction reference positions,
 2. comparing a magnitude relationship of the distances calculated in step 1 with suction reference positions that present either in a clockwise direction as a direction in which θ decreases or a counterclockwise direction as a direction in which θ increases with respect to a suction reference position arbitrarily selected as a start position and that have not yet been compared,
 3. with the comparison in step 2, one of:
  selecting one of two suction reference positions which is the suction reference position having a smaller distance than the other one, or
  selecting either of the two suction reference positions when the suction reference positions have equal distances, and
 4. repeating the comparison in step 2 and the selection in step 3 until the comparison of step 2 and the selection of step 3 which is performed in the counterclockwise direction or the clockwise direction with respect to the suction reference position specified in step 2 reaches an adjacent suction reference position.

3. The method for producing a three-dimensional shaped product according to claim 1, wherein the shape of the shaping table is rectangular and the suction device is set in a parallel state with respect to rectangular sides of the table, and the step of selecting the suction reference position with the shortest distance from a center location of the irradiation reference position P includes the following steps:
 1. selecting, at orthogonal coordinates (x, y) with a center location of the shaping table as an origin, an x-axis and y-axis that are parallel to the rectangular sides, and judging coordinates (a, b) of the irradiation reference position P that is currently being irradiated,
 2. setting four coordinates (A, b), (−A, b), (a, B), (a, −B) in which straight lines are parallel to the x-axis direction and y-axis direction from coordinates (a, b) crossing with openings of the suction device,
 3. selecting the shortest distance among A−a, A +a, B−b and B +b which are distances between the position of coordinates (a, b) and the four coordinates, and
 4. selecting the suction reference position having the minimum distance with respect to the coordinate position selected in step 3.

4. A method for producing a three-dimensional shaped product which employs a forming process in a shaping region, comprising the steps of:
 dispersion of powder by a squeegee on a shaping table disposed within a chamber,
 irradiation of each powder layer formed by the dispersion with a laser beam or an electron beam,
 setting a suction device that communicates with a collector that collects fumes generated from the powder layers due to the irradiation, and that sucks the fumes, at an upper side of the shaping table and surrounding an entire periphery of the shaping table in reference to a horizontal direction,
 situating suction zones that achieve independent suction work by the suction device at equal intervals with a suction reference position being specified at a center location of each suction zone,
 setting a common operating time range for each suction zone,
 one of:
  setting multiple resting irradiation reference positions based on regularly arranged positions at equal intervals in a two-dimensional direction for each powder layer, and after judging an irradiation reference position P that is currently irradiated among the multiple resting irradiation reference positions, setting an adjacent irradiation reference position P' calculated by a time within the time range according to a traveling direction and traveling speed of an irradiation position at the irradiation reference position P, or
  setting multiple moving irradiation reference positions for the irradiation position moving within each powder layer with a unit of moving time where the moving time is a time range set for each suction reference position from an initial irradiation position, and after judging an irradiation reference position P that is currently irradiated among the multiple moving irradiation reference positions, setting the irradiation reference position P and an adjacent irradiation reference position P' that is expected to move from the irradiation reference position P through a time based on the time range, and sending an operational command for suction to a suction zone corresponding to each suction reference position at a position on a side opposite from the adjacent irradiation reference position P' based on a straight line at the irradiation reference position P which is perpendicular to a straight line connecting the irradiation reference positions P and P'.

5. The method for producing a three-dimensional shaped product according to claim 4, further comprising the step of selecting each suction reference position at a position on the side opposite from the adjacent irradiation reference position P' with reference to the straight line by the following steps:
 1. setting an equation for the perpendicular line as follows:

$$r \cos \theta/_a + r \sin \theta_b = 1$$

in polar coordinates (r, θ) with the center location of the shaping table as the origin,
  wherein a and b are respectively at angles of θ=0 and θ=π/2, and in the case that coordinates of the irradiation reference position P currently being irradiated are (R, α) and coordinates of the adjacent irradiation reference position P' are (R', α'), then applying $$a = \{R \cdot R' \cos(a-a') - R^2\}/(R' \cos a' - R \cos a)$$

$$b = \{R \cdot R' \sin(a-a') - R^2\}/(R' \sin a' - R \sin a),$$

2. judging a magnitude relationship between $$R' \cos a'/_a + R' \sin a'/_b$$

and 1 for the adjacent irradiation reference position P' (R' , α'),

3(1). in the case of $$R' \cos a''_a + R' \sin a''_b > 1$$

in step 2, selecting a suction reference position which satisfies:

$$R'' \cos a''_a + R'' \sin a''_b \leq 1$$

for coordinates (R", α") of each suction reference position,

3(2). in the case of $$R' \cos a''_a + R' \sin a''_b < 1$$

in step 2, selecting all suction reference positions which satisfies:

$$R'' \cos a''_a + R'' \sin a''_b \geq 1$$

for coordinates (R", α") of each suction reference position.

6. The method for producing a three-dimensional shaped product according to claim 4, wherein each suction reference position at a position on the side opposite from the adjacent irradiation reference position P' is selected with reference to the straight line by the following steps:

1. setting an equation for the perpendicular line as follows:

$$r \cos \theta_a + r \sin \theta_b = 1$$

in polar coordinates (r, θ) with the center location of the shaping table as the origin,
wherein a and b are respectively at angles of θ=0 and θ=π/2, and
in the case that coordinates of the irradiation reference position P currently being irradiated are (R, α) and coordinates of the adjacent irradiation reference position P' are (R', α'), then $$a = \{R \cdot R' \cos(a-a') - R^2\}/(R' \cos a' - R \cos a)$$

$$b = \{R \cdot R' \sin(a-a') - R^2\}/(R' \sin a' - R \sin a),$$

is applied, 2. calculating two intersections $Q_1$ ($R_1'$, $α_1'$) and $Q_2$ ($R_2'$, $α_2'$) between the line equation and lines at openings of the suction device,
   wherein $Q_1$ is a position to the left, or above, or the top left side with respect to $Q_2$,
3. judging a magnitude relationship between $$R' \cos a'_a + R' \sin a'_b$$

and 1 for the adjacent irradiation reference position P' (R' , α'), α'),

4(1). in the case of $$R' \cos a''_a + R' \sin a''_b > 1$$

in step 3, successively selecting suction reference positions that are present within a range from $Q_1$ up to $Q_2$ in the counterclockwise direction in which θ increases.

4(2). in the case of $$R' \cos a''_a + R' \sin a''_b < 1$$

in step 3, successively selecting suction reference positions that are present within a range from $Q_1$ up to $Q_2$ in the clockwise direction in which θ decreases.

7. The method for producing a three-dimensional shaped product according to claim 1,
wherein the suction device has each suction zone arranged in a connected manner without division, and
wherein an opening and closing valve corresponding to each suction zone is provided mutually adjacent to an entrance of each suction zone, and
further comprising the step of opening the opening and closing valve at a suction zone to which an operational command for suction is executed.

8. The method for producing a three-dimensional shaped product according to claim 1,
wherein respective suction zones of the suction device are arranged with a mutually divided state,
wherein an opening and closing valve corresponding to each suction zone is installed at one of:
an entrance of the suction zone, midway in each pipe connecting each suction zone with a fume collector, or the end on the fume collector side, and
further comprising sending an operational comment for suction to the opening and closing valve of the suction reference position for opening the opening and closing valve.

9. The method for producing a three-dimensional shaped product according to claim 1,
wherein a respective suction zone of the suction device is arranged in a mutually divided state, while a suction fan and a suction switch connected to the suction fan are installed in each suction zone, and
further comprising the step of operating the suction switch and suction fan for the suction zone to which the operational command for suction is executed.

10. The method for producing a three-dimensional shaped product according to claim 1, further comprising the step of setting a degree of suction per unit area of the suction device to be greater in accordance with the greater amount of irradiation by the laser beam or the electron beam that is set.

11. The method for producing a three-dimensional shaped product according to claim 1, further comprising the step of setting a distance between ends of the shaping table and the opening of the suction device of the fume to be equidistant over the entire periphery of the shaping table along the horizontal direction.

12. The method for producing a three-dimensional shaped product according to claim 1, wherein a planar shape of the shaping table along the horizontal direction is a square, and the suction device of the fume is arranged so as to form sides of the square.

13. The method for producing a three-dimensional shaped product according to claim 1, wherein a planar shape of the shaping table along the horizontal direction is circular, and the suction device of the fume is arranged in a concentric state with respect to the circular shape.

14. The method for producing a three-dimensional shaped product according to claim 4,
wherein the suction device has each suction zone arranged in a connected manner without division, and
wherein an opening and closing valve corresponding to each suction zone is provided mutually adjacent to an entrance of each suction zone, and
further comprising the step of opening the opening and closing valve at a suction zone to which an operational command for suction is executed.

15. The method for producing a three-dimensional shaped product according to claim 4,
wherein respective suction zones of the suction device are arranged with a mutually divided state, wherein an opening and closing valve corresponding to each suction zone is installed at one of:
an entrance of the suction zone, midway in each pipe connecting each suction zone with a fume collector, or
the end on the fume collector side, and
further comprising sending an operational comment for suction to the opening and closing valve of the suction reference position to which the operational command for suction is sent for opening the opening and closing valve.

16. The method for producing a three-dimensional shaped product according to claim 4,
wherein a respective suction zone of the suction device is arranged in a mutually divided state, while a suction fan and a suction switch connected to the suction fan are installed in each suction zone, and
further comprising the step of operating the suction switch and suction fan for the suction zone to which the operational command for suction is executed.

17. The method for producing a three-dimensional shaped product according to claim 4, further comprising the step of setting a degree of suction per unit area of the suction device to be greater in accordance with the greater amount of irradiation by the laser beam or the electron beam that is set.

18. The method for producing a three-dimensional shaped product according to claim 4, further comprising the step of setting a distance between ends of the shaping table and the opening of the suction device of the fume to be equidistant over the entire periphery of the shaping table along the horizontal direction.

19. The method for producing a three-dimensional shaped product according to claim 4, wherein a planar shape of the shaping table along the horizontal direction is a square, and the suction device of the fume is arranged so as to form sides of the square.

20. The method for producing a three-dimensional shaped product according to claim 4, wherein a planar shape of the shaping table along the horizontal direction is circular, and the suction device of the fume is arranged in a concentric state with respect to the circular shape.

* * * * *